(12) United States Patent
Zhou et al.

(10) Patent No.: US 8,971,927 B2
(45) Date of Patent: Mar. 3, 2015

(54) SYSTEM AND METHOD FOR PREVENTING CELL PHONE USE WHILE DRIVING

(76) Inventors: Xuesong Zhou, Sandy, UT (US); Wallace Curry, Hays, KS (US)

(*) Notice: Subject to any disclaimer, the term of this patent is extended or adjusted under 35 U.S.C. 154(b) by 53 days.

(21) Appl. No.: 13/123,490

(22) PCT Filed: Oct. 6, 2009

(86) PCT No.: PCT/US2009/059732
§ 371 (c)(1),
(2), (4) Date: Jun. 28, 2011

(87) PCT Pub. No.: WO2010/042545
PCT Pub. Date: Apr. 15, 2010

(65) Prior Publication Data
US 2011/0294520 A1 Dec. 1, 2011

Related U.S. Application Data

(60) Provisional application No. 61/104,171, filed on Oct. 9, 2008.

(51) Int. Cl.
*H04W 24/00* (2009.01)
*H04M 3/42* (2006.01)
(Continued)

(52) U.S. Cl.
CPC .............. *H04W 48/04* (2013.01); *H04W 4/027* (2013.01); *G01S 2205/002* (2013.01)
USPC ....................................... 455/456.3; 455/414

(58) Field of Classification Search
CPC ....... H04W 4/02; H04W 4/025; H04W 4/028; H04W 4/04; H04W 4/043; H04W 4/046; H04W 48/00; H04W 48/02; H04W 48/04; H04M 1/72577
USPC ......... 455/4.1, 404.2, 418–422.1, 432.1–444, 455/456.1, 456.3, 457, 458, 461, 466, 41.2, 455/26.1, 515, 521, 79, 550.1, 552.1, 553.1, 455/556.1, 557, 565, 569.1, 569.2, 575.9, 455/151.2, 345, 404.1; 370/310.2, 370/328–331, 338, 352–356, 522; 340/933–943, 988–996, 426.2, 426.21, 340/539.23; 701/408–541
See application file for complete search history.

(56) References Cited

U.S. PATENT DOCUMENTS 5,631,947 A 5/1997 Wittstein et al.
5,642,402 A 6/1997 Vilmi et al.
(Continued)

FOREIGN PATENT DOCUMENTS

CN 1388698 1/2003
CN 101018067 8/2007
(Continued)

OTHER PUBLICATIONS

PCT Application PCT/US2010/055872; filed Nov. 8, 2010; Xuesong Zhou; International Search Report mailed Jul. 1, 2011.
(Continued)

*Primary Examiner* — San Htun
(74) *Attorney, Agent, or Firm* — Thorpe North & Western LLP

(57) ABSTRACT

A system for monitoring and controlling the use of a mobile computing device is disclosed. The system includes a data server (104) containing a model of a road network specifying traffic routes at a selected location. A mobile wireless computing device (106) is configured to wirelessly communicate with the data server (104). An embedded accelerometer (116) and a GPS receiver (114) are included in the wireless device (106). A mobile device control module in communication with the wireless device (106) and the data server (104) provides a motion data cache (118) to record data from the GPS receiver (114) and accelerometer (116), an activity mode recognition module (120) configured to determine a type of activity based on the motion data cache (118), and a use permission module (112) in communication with the data server (104) to provide timing and location information at which the wireless device (106) can be used based on the activity mode.

20 Claims, 5 Drawing Sheets

(51) Int. Cl.
*H04W 48/04* (2009.01)
*H04W 4/02* (2009.01)

(56) References Cited

U.S. PATENT DOCUMENTS

| | | |
|---|---|---|
| 5,664,012 A | 9/1997 | Chen |
| 5,835,022 A | 11/1998 | Amano |
| 6,011,973 A | 1/2000 | Valentine et al. |
| 6,075,999 A | 6/2000 | Vilmi et al. |
| 6,188,315 B1 | 2/2001 | Herbert et al. |
| 6,233,448 B1 | 5/2001 | Alperovich et al. |
| 6,233,468 B1 | 5/2001 | Chen |
| 6,314,179 B1 | 11/2001 | Chen |
| 6,349,223 B1 | 2/2002 | Chen |
| 6,353,778 B1 | 3/2002 | Brown |
| 6,393,301 B1 | 5/2002 | Oda |
| 6,453,180 B1 | 9/2002 | Endoh et al. |
| 6,535,811 B1 | 3/2003 | Roland et al. |
| 6,600,975 B2 | 7/2003 | Moriguchi et al. |
| 6,690,940 B1 | 2/2004 | Brown et al. |
| 6,711,480 B2 | 3/2004 | Yamamoto et al. |
| 6,731,925 B2 | 5/2004 | Naboulsi |
| 6,771,946 B1 | 8/2004 | Oyaski |
| 6,968,311 B2 | 11/2005 | Knockeart et al. |
| 6,973,333 B1 | 12/2005 | O'Neil |
| 7,006,793 B2 | 2/2006 | Himmel et al. |
| 7,009,488 B2 | 3/2006 | Schwartz |
| 7,024,176 B2 | 4/2006 | Shimizu et al. |
| 7,181,229 B2 | 2/2007 | Singh et al. |
| 7,260,390 B1 | 8/2007 | Skinner et al. |
| 7,302,272 B2 | 11/2007 | Ackley |
| 7,437,168 B1 | 10/2008 | Westfield |
| 7,477,135 B2 | 1/2009 | Belcher et al. |
| 7,551,930 B2 | 6/2009 | Lempio et al. |
| 7,697,917 B2 | 4/2010 | Camp, Jr. et al. |
| 7,933,611 B2 | 4/2011 | Bocking et al. |
| 8,126,450 B2 | 2/2012 | Howarter et al. |
| 8,145,199 B2 | 3/2012 | Tadoyon et al. |
| 2002/0128000 A1 | 9/2002 | do Nascimento, Jr. |
| 2003/0003892 A1 | 1/2003 | Makinen |
| 2003/0096593 A1 | 5/2003 | Naboulsi |
| 2003/0231550 A1 | 12/2003 | Macfalane |
| 2004/0209594 A1 | 10/2004 | Naboulsi |
| 2005/0131597 A1* | 6/2005 | Raz et al. ............... 701/29 |
| 2005/0221841 A1 | 10/2005 | Piccionelli et al. |
| 2005/0255874 A1 | 11/2005 | Stewart-Baxter et al. |
| 2006/0105740 A1 | 5/2006 | Puranik |
| 2006/0148490 A1 | 7/2006 | Bates et al. |
| 2006/0205394 A1 | 9/2006 | Vesterinen |
| 2007/0037605 A1* | 2/2007 | Logan ................ 455/567 |
| 2007/0041552 A1 | 2/2007 | Moscato |
| 2007/0072553 A1* | 3/2007 | Barbera ............. 455/67.11 |
| 2007/0072616 A1 | 3/2007 | Irani |
| 2007/0086579 A1 | 4/2007 | Lorello et al. |
| 2007/0142068 A1* | 6/2007 | Matsuo ............... 455/515 |
| 2007/0222291 A1 | 9/2007 | Shimomura |
| 2008/0014869 A1 | 1/2008 | Demirbasa et al. |
| 2008/0014966 A1 | 1/2008 | Chakraborty et al. |
| 2008/0045234 A1 | 2/2008 | Reed |
| 2008/0064446 A1 | 3/2008 | Camp et al. |
| 2008/0129475 A1 | 6/2008 | Breed et al. |
| 2008/0146211 A1* | 6/2008 | Mikan et al. ............. 455/419 |
| 2008/0214211 A1* | 9/2008 | Lipovski ............. 455/456.4 |
| 2008/0220715 A1 | 9/2008 | Sinha et al. |
| 2008/0243558 A1 | 10/2008 | Gupte |
| 2008/0268768 A1 | 10/2008 | Brown et al. |
| 2008/0299900 A1* | 12/2008 | Lesyna ................ 455/26.1 |
| 2008/0305735 A1 | 12/2008 | Farmsworth |
| 2009/0024419 A1* | 1/2009 | McClellan et al. ........... 705/4 |
| 2009/0029675 A1 | 1/2009 | Steinmetz |
| 2009/0033494 A1 | 2/2009 | Malik |
| 2009/0051510 A1 | 2/2009 | Follmer |
| 2009/0098855 A1 | 4/2009 | Fernandez et al. |
| 2009/0117919 A1 | 5/2009 | Hershenson |
| 2009/0195370 A1 | 8/2009 | Huffman et al. |
| 2010/0210254 A1 | 8/2010 | Kelly et al. |
| 2010/0233959 A1 | 9/2010 | Kelly et al. |
| 2011/0009107 A1 | 1/2011 | Guba et al. |
| 2011/0021234 A1 | 1/2011 | Tibbitts et al. |
| 2011/0093161 A1 | 4/2011 | Zhou |

FOREIGN PATENT DOCUMENTS

| | | |
|---|---|---|
| CN | 101132433 | 2/2008 |
| EP | 1745427 | 1/2007 |
| GB | 2273580 | 6/1994 |
| JP | 2002/009902 | 6/2000 |
| JP | 2004/179973 | 6/2004 |
| JP | 2006/173782 | 12/2004 |
| JP | 2005-277905 | 10/2005 |
| KR | 10-0742112 | 7/2007 |
| KR | 10-0796714 | 1/2008 |
| KR | 10-2009-0096051 | 9/2009 |
| WO | WO 03/028342 | 4/2003 |
| WO | WO 03/036805 | 5/2003 |
| WO | WO 2004/019646 | 3/2004 |
| WO | WO 2006/070168 | 7/2006 |
| WO | WO 2007/016641 | 2/2007 |
| WO | WO 2007/040777 | 4/2007 |
| WO | WO 2008/027076 A1 | 3/2008 |
| WO | WO 2008/059727 | 5/2008 |
| WO | WO 2010/042542 | 4/2010 |
| WO | WO 2010/051455 | 5/2010 |
| WO | WO 2010/129939 | 11/2010 |
| WO | WO 2011/011544 | 1/2011 |

OTHER PUBLICATIONS

Barreras et al.; Convenient or Invasive: The Information Age; May 2007; 11 pages, chpt 18; Ethica Publishing.

Borzo; Eyes on the Road; CNNMoney; http://money.cnn.com/magazine/business2/business2_archive/2006/01//8394982/index . . . ; Mar. 15, 2007.

Cabrero; New Device Aims to Make Teens Safer Drivers; KSL.com; http://www.ksl.com/?nid=148&sid=8876787; Dec. 1, 2009; 2 pages.

Drivcam, the Driver Science Company; http://www.drivecam.com/; as accessed on Jul. 28, 2008; 2 pages.

Getisight, Real-Time Mobile Tracking, Where your teenagers are NOW?; http://getisight.com; as accessed on Jul. 28, 2008; 1 page.

GPS Teen Tracking, Monitor Your Teenagers Driving Habits Online; http://www.gpsteentracking.com/?gclid=CM-5oezw74QCFRZZiAodfHU5RA as accessed on Jul. 28, 2008; 2 pages.

Guardiangel; http://www.guardianangeltech.com/Cell_Phone_for_; Teenagers.html; as accessed on Jul. 28, 2008; 2 pages.

How IT Works: Snapshot Discount, Usage-Based Insurance—Progressive; as accessed on Apr. 6, 2011; 2 pages.

PCT Application PCT/US2009/059732; filed Oct. 6, 2009; Wallace Curry; ISR mailed May 28, 2010.

PCT Application PCT/US2009/062788; filed Oct. 30, 2009; Xuesong Zhou; ISR mailed Jun. 18, 2010.

Rocky Mountain Tracking, Inc., GPS Tracking; The Single Source for all your GPS Tracking Needs; http://www.rmtracking.com/teentracking.php; as accessed on Jul. 28, 2008; 4 pages.

SmoothTalker High Performance Cellular Antenna Connection Cables; https://www.smoothtalker.com/products/cellular-antennas/afntenna-connection_-cables/ ; as accessed on Sep. 29, 2009; 2 pages.

Technology Demonstrations, Experience VII and Other Vehicle Technologies Right on the Streets of New York; 15th World Gongress on ITS, Nov. 16-20, 2008, Jacob K. Javits Convention Center, New York City, NY; http://itswc2008.ntpshowsites.com/technology-demonstrations.html; 1 page.

TTFF Comparisons; PocketGPSWorld.com; http://pocketgpsworld.com/ttffcomparisons.php; May 4, 2003; 3 pages.

Applikompt™, applied Computer Technologies™, Inc.; http://actplace.net/InvestorsPamphlet.htm; as accessed on Oct. 9, 2009; 3 pages.

(56) References Cited

OTHER PUBLICATIONS

Applikompt™, Applied Computer Technologies™, Inc.; http://actplace.net/Press%20Release.htm; as accessed on Oct. 9, 2009; 3 pages.

U.S. Appl. No. 12/758,637, filed Apr. 12, 2010; Xuesong Zhou; office action mailed Dec. 27, 2011.

U.S. Appl. No. 13/127,186, filed Jun. 28, 2011; Xuesong Zhou; office action dated Jan. 8, 2014.

EP Application 09819775.9; filed Oct. 6, 2009; University of Utah Research Foundation; European Search Report dated Jul. 11, 2014.

* cited by examiner

SYSTEM AND METHOD FOR PREVENTING CELL PHONE USE WHILE DRIVING

BACKGROUND

In 2007, statistics show that about 84% of the US population subscribed to a form of wireless mobile phone service. Approximately 6% of automobile drivers admitted to using hand-held phones while driving. The actual number of drivers using wireless devices is likely much greater. Researchers have shown that using mobile phones while driving is four times as likely to get into crashes, and the increased crash risk is similar for hands-free and hand-held phones.

The U.S. Department of Transportation has launched numerous programs and initiatives to reduce traffic-related fatalities and injuries. Many states explicitly prohibit talking, text-messaging or playing video games on hand-held mobile phones while driving. Additionally, a number of states, such as California, have passed laws banning or restricting young drivers (under age 18) from using mobile phones, or other types of mobile devices while driving. However, a recent study in North Carolina finds that teenagers seem to ignore such restrictions. A ban on the use of wireless devices by teenagers while driving was enacted in spring, 2007. The study found that approximately 11% of teenage drivers observed departing 25 high schools were using mobile phones during the two months before the restrictions were enacted, while about 12% of teenage drivers were observed using mobile phones during the five months after the enactment of the restrictions.

Currently, mobile phone usage is no longer limited to making and receiving calls. Both Global Positioning System (GPS) and accelerometer sensors have been widely supported in the next generation of mobile phones (i.e. cell phones, smart phones). For example, both GPS and accelerometer sensors have been equipped in iPhone 3G smart phones from Apple Inc., while 50% of Nokia mobile phones shipped in 2009 will be GPS-enabled.

SUMMARY

A system for monitoring and controlling the use of a mobile computing device is disclosed. The system includes a data server containing a model of a road network specifying traffic routes at a selected location. A mobile wireless computing device is configured o wirelessly communicate with the data server. An embedded accelerometer and a GPS receiver are included in the wireless device. A mobile device control module in communication with the wireless device and the data server provides a motion data cache to record data from the GPS receiver and accelerometer, an activity mode recognition module configured to determine a type of activity based on the motion data cache, and a use permission module in communication with the data server to provide timing and location information at which the wireless device can be used based on the activity mode. The mobile device control module can be downloaded and operated on the wireless device, with some aspects of the control module operated on and communicated with the data server.

A computing device in communication with the data server can be used to select timing and location information in which use of the wireless device is permitted or restricted. For example, a graphical user interface can be used to restrict use of the wireless device during certain periods such as school time or after a curfew time. Use may also be restricted at certain geographic locations or paths, such as along a route to school, or work, or at a specific location such as a user's school. In addition, use of the wireless device may be permitted along a known bus route.

The motion data cache can also be used to record the location, speed, and acceleration of the mobile wireless computing device each time a phone call is transmitted from or received by the wireless device. The data in the motion data cache can be transmitted to and stored on the data server. The data in the motion data cache can be compared with the user permission data to enable a driver safety statistic to be calculated based on when and where the wireless computing device was used and the motion of the device. The driver safety statistic may be decreased for certain user behaviors, such as use of the device while driving a vehicle, and use of the device during restricted time periods. In addition, the wireless device may collect data during periods other than when phone calls are answered or made. For example, the wireless device may collect speed and location information and report that information back to the data server. The driver safety statistic can also be decreased based on driving behavior, such as speeding, abnormal acceleration, abnormal deceleration, and taking sharp turns. The safety statistic can be reported to or calculated at the data server.

The safety statistic and other information collected by the wireless device can be made available to selected individuals, such as a user's parents or guardian, or desired a third party such as an insurance company. The insurance company can provide the user a discounted rate in return for the user maintaining a safety statistic that is greater than a selected threshold value.

The activity recognition module is configured to identify when the user of the wireless device is performing a task, such as walking, running, or driving. In addition, the activity recognition module can identify when a user is substantially stationary.

A dynamic call handling module is configured to place the wireless device in a selected mode based on the activity mode. For example, when it is identified that the user is driving based on information from the accelerometer and GPS receiver, then the wireless device can be placed in a driving mode. The module can be used to communicate to a caller that the mobile wireless computing device is not available when the activity mode recognition module identifies a specific type of restricted activity, such as driving. The module may disable the wireless device from making or receiving calls in certain modes, such as the driving mode. Alternatively, selected phone calls, such as emergency phone calls may be allowed. The wireless device may emit a selected ringtone when the user is driving to allow the user to stop the vehicle and answer the phone call. The dynamic call handling module can also be used to send a message to the caller that the user is not available because he or she is driving.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
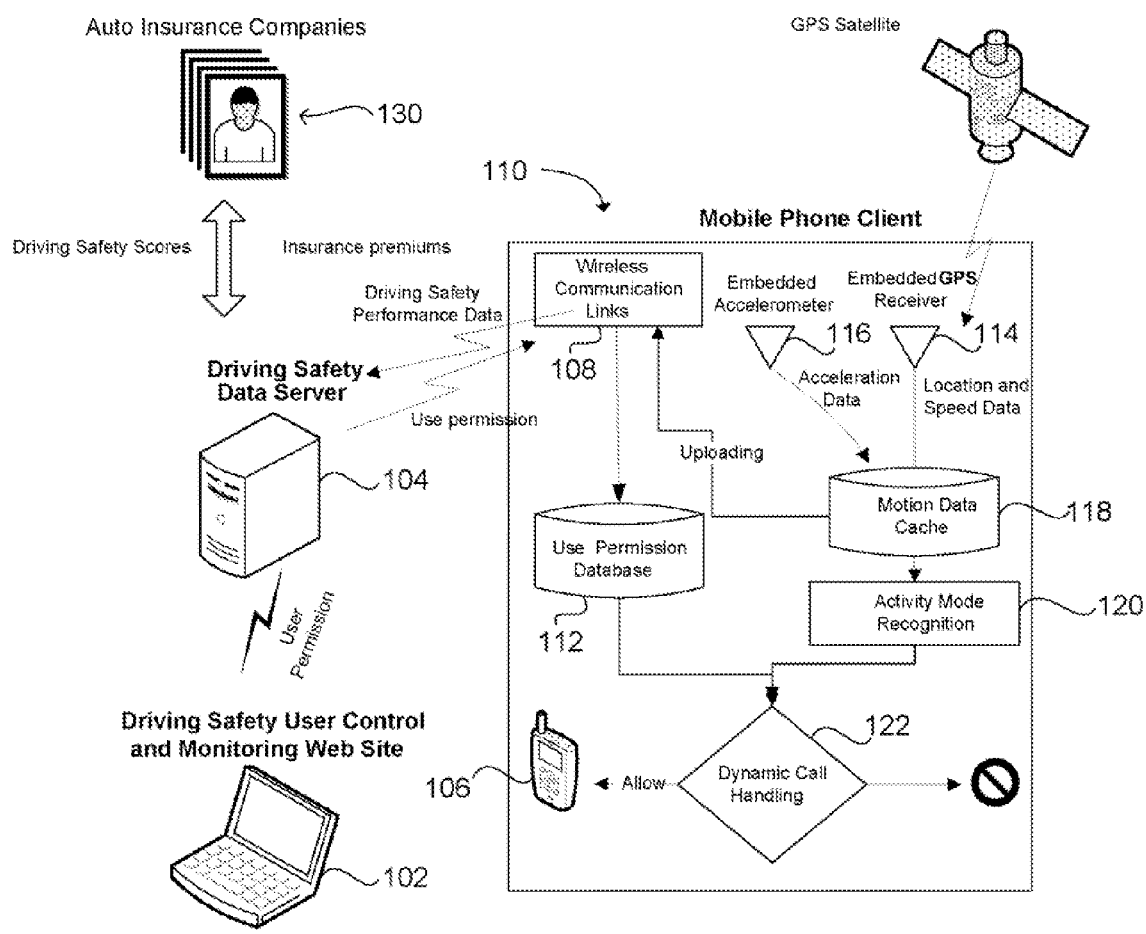
FIG. 1 is an illustration of a system for monitoring and controlling the use of a mobile computing device in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Example Embodiments

By utilizing GPS and accelerometer sensors embedded in mobile phones to monitor driving safety performance, an integrated and economical solution can be created to detect and prevent unsafe driving behavior such as talking on or texting with mobile phones while driving. In one embodiment, the driving safety data can be recorded in mobile phones and then transmitted to a centrally managed data server through wireless communication links, such as GSM/GPRS. Usage restrictions on mobile phones, such as permissible traffic routes and schedules, can be input through an internet web site and further sent to designated mobile phones. A driving safety evaluation module can be used to perform a statistical analysis on collected raw driving data. The evaluation module can then calculate corresponding safety scores. The safety scores can be used by consumers and insurance agencies to determine insurance premiums for related drivers. The system can also be used by parents to prevent their teenage drivers from operating a motorized vehicle while texting, calling or performing other unsafe driving actions. The system can also be used by commercialized vehicle companies, rail companies, and the like to proactively control the use of mobile devices while their commercial vehicle drivers are operating vehicles, trains, airplanes, helicopters, and the like.

While the term "mobile phone" is used throughout the device, the invention is not limited to wireless or cellular telephones. The term "mobile phone" can include any type of electronic mobile computing device that may be used while traveling in a vehicle. The term GPS is used throughout the specification to refer to a positional tracking technology. Other types of positional tracking technologies can be used as well, such as triangulation based on signals received from cell towers, and similar technologies.

In one embodiment illustrated in FIG. 1, the system comprises a client/server architecture, which consists of a centrally managed driving safety data server 104, an interactive user control web site 102, and a network of mobile phones 106 equipped with GPS 114 and/or accelerometer 116 sensors. One embodiment of the system is described as follows.

Use Permission Data Input

A graphical user interface can be installed on a data input device 102, such as a computer, laptop, smart phone, or other computerized device. The graphical user interface can be used to communicate, via a connection such as an internet connection, with a data server 104. The data server can include geographic data that enables parents or commercialized vehicle companies to specify permissible or restricted routes and time schedules for the use of calling or texting capability in a mobile phone 106 when the phone is in driving mode. Restricted routes can be selected based on the driver's typical driving patterns, such as to school, sporting events, and leisure activities. For passengers, the permissible routes can include bus routes and metro routes that will enable passenger phones to operate while the phone is moving at a relatively high rate of speed. For train operators, a train's route can be easily specified using the graphical user interface, thereby restricting a train operator from using selected mobile devices while the train is in operation.

Use Permission Data Retrieval

A client 110 unit on a GPS-enabled mobile phone 106 establishes a wireless connection 108 to the driving safety data server 104 in a computer network. A user can download the required software from the server 104 to the mobile phone 106 to set up the client unit on the phone. In response to a request from the client unit on the mobile phone, the driving safety data server can return use permission data to a specific phone client. The phone client can store the permission data into a local use permission database 112 for easy access.

Motion Data Recording

When a call is made or received using a mobile phone 106, the mobile phone client 110 can record location, speed and acceleration data from sensors embedded in the wireless device, such as a GPS sensor 114 and accelerometer 116. The data can be recorded to a local motion data cache 118 for further processing. The local data cache can be used to store raw data for an extended time period of time in order to provide sufficient information for a user activity mode recognition program 120.

User Activity Mode Recognition

Based on collected data in the motion data cache 118, a user activity mode recognition program 120 estimates the context of mobile phone use. For example, the mobile phone or other electronic device may be used while driving, walking or remaining still. The user activity mode recognition program can be used to determine if the use of a mobile phone in the related context violates the pre-set permission policies.

Dynamic Call Handling

If a phone call is received at the mobile phone 106 and the user mode is recognized as driving, a dynamic call handling program 122 that is in communication with the activity mode recognition program 120 can be used to enable the phone 104 to communicate to a caller that the mobile phone user is currently driving. The phone can also signal to the driver with a different ringtone based on the predefined caller priority so that the driver can decide whether to pull over the car to take the call or call back later.

Motion Data Uploading

Through mobile phone communication links, motion data and activity mode estimation results of a user of the mobile phone 106 can be transmitted to the driving safety data server 104, and further displayed through an interactive user control website to enable visualization of possible violations of mobile phone use or unsafe driving behavior such as speeding, abnormal deceleration and sharp turns.

Safety Score Evaluation

Based on a statistical analysis method, the raw driving performance data of a user of the mobile phone 106 can be processed to provide a driving safety index or score for the user.

Safety Evaluation Data Sharing

Through a data exchange server or a data exchange interface, a system user can share the safety score of the user of the mobile phone 106 with a third party such as an insurance company 130 to obtain insurance premiums. The cost of the insurance premium for the user can be reduced or increased based on the safety score of the user. In one embodiment, the premium cost may be adjusted periodically based on the user's safety score during the previous period. For example, the cost may be adjusted monthly, quarterly, semi-annually, or annually. In addition, a commercial vehicle operator can be offered incentives based on the operator's safety score, thereby encouraging the vehicle operator to operate the vehicle within acceptable parameters.

GPS Mode and Communication Mode

In one embodiment, a mobile phone 106 can have two mutually exclusive modes: a GPS monitoring/navigation mode and a communication mode. Based on acceleration data from the embedded accelerometer 116, an always-on activity recognition program can detect the activity status of a mobile phone user during various activities. The activity status of the mobile phone may be listed as: driving, walking, remaining still, or unknown due to insufficient data. If the status of the mobile phone user is recognized as driving, the mobile phone can automatically switch to the GPS navigation mode to prevent the use of communication capabilities except for emergency calls. If the mobile phone user is recognized as not driving, the mobile phone can switch back to the communication mode.

The use of the mobile phone client 110 that includes the motion data cache 118, the activity mode recognition 120, the use permission database 112, and the dynamic call handling module 122 provides a reliable method to detect and prevent talking while driving. For example, the mobile phone client does not block a phone call based on delayed and inaccurate GPS data. Use of GPS data alone can create unreliable mode recognition results. This can result in incorrect disruption of cell phone service which can lead to unpleasant user experiences and further limit the system deployment.

Figure 4:
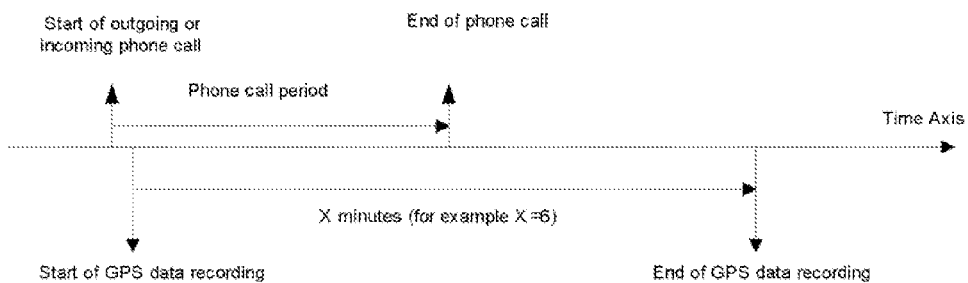
FIG. 4 is a timeline of a GPS collection data period in accordance with an embodiment of the present invention.

Instead of merely relying on GPS data, the mobile phone client 110 first records the position, speed and acceleration data for a certain time period. For example, in one exemplary embodiment, the data may be recorded for a period of up to several minutes. The motion data can be recorded even after a phone call or text messages ends, as shown in FIG. 4. In the post-processing stage, the activity mode recognition module can be used to determine the context of a phone call to a selected user based on previously collected motion data, and adjust the related safety score for the user if a violation is identified. The system can be used to prevent talking/texting while driving by penalizing the unsafe behavior after the fact. With better data availability, the user mode recognition program can better identify the context of a phone call, and make driving safety monitoring more reliable.

The mobile phone client 110 utilizes the GPS 114 and accelerometer 116 sensors embedded in mobile phones to track location, speed and acceleration data of a driver. The communication links available in the mobile phone can be used to transit driving safety performance data to a central data server. The seamlessly integrated tracking and communication capabilities do not require additional or external hardware purchase or modifications. The system can be easily deployed by a software download from the Internet to a mobile phone. The system provides a more economical and convenient method to enforce personalized driving safety regulations. For example, the system can be used to enforce a mandatory 50 hours supervised driving practice for new drivers, as required by many states.

Additionally, by monitoring and sharing the driving safety performance data between insurance policyholders and insurance companies, the invention provides more incentives in terms of credits or discounts for insurance policyholders and insurance companies to work together to improve driver safety performance. The system can prevent countless motorized vehicle accidents and deaths, thereby enabling a significant amount of money to be saved for the mobile phone owner and insurance company. In addition, commercial companies employing drivers can be assured that their drivers will not be distracted by wireless devices. This can significantly reduce potentially catastrophic accidents for which the company may be responsible.

While the mobile phone client 110 is illustrated in FIG. 1 as including a variety of modules, caches, and databases, it is also possible that these may be located remotely, such as on the driving safety server, or on a mobile phone service provider's network. The location of software and firmware used to create the functionality of the system for monitoring and controlling the use of a mobile computing device illustrated in FIG. 1 can be based on a tradeoff between the complexity of the mobile device and the amount of information communicated on the mobile device's network. By placing more modules, caches, and databases on the mobile device, it can require a more complex device (having more memory). However, the amount of communication needed to operate the system can be reduced. Conversely, locating more of the modules, caches and databases remotely can enable the use of a simpler mobile device, but may require additional communication between the mobile device 106, the driving data safety server 104, and the mobile device service provider (not shown). The actual location of the modules, caches, and databases can be decided based on engineering and business needs.

Figure 2:
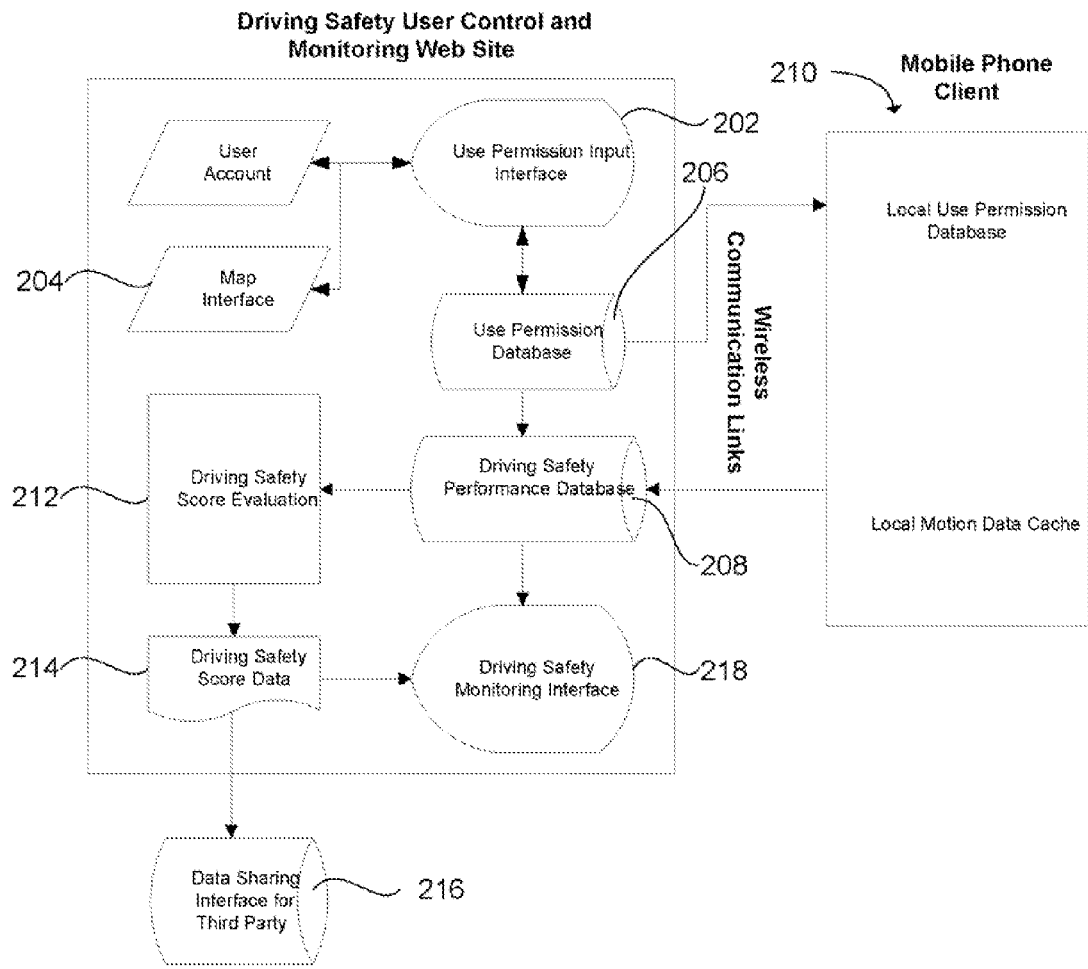
FIG. 2 is a flow chart depicting a user permission management and driving safety monitoring system on a web server in accordance with an embodiment of the present invention.

FIG. 2 illustrates a flow chart depicting a user permission management and driving safety monitoring system located on a web server. In one example embodiment, a parent can use a the use permission input interface 202 to input their teen driver's cell phone number and the parent's phone number that can receive the teen driver's safety violation records by phone calls, voice mails or text messages. Through a web-based map interface 204, the parent may further specify locations, routes and areas where their teenagers are permitted or not allowed to use the cell phone and/or drive a car. A parent may detail a time schedule and speed limit associated with each route or each type of road that their teen drivers should strictly obey. All the use permission data are organized and combined into a use permission database 206, which can be further compressed to different data formats and wirelessly sent to the corresponding mobile phone client 210 operating on a mobile phone or other type of communication device for phone and automobile usage monitoring purposes. The motion data from a mobile phone can be transmitted to the driving safety performance database in the data server 208.

The safety performance data and use permission data can be cross-checked with each other and used in a later driving safety score evaluation module 212. For example, an initial driving score can be set as 100 points for a selected period, such as the period in which the car is in motion (i.e. the trip), or for a set period such as a day. Point deductions from the initial driving score can be determined by the relationship between types of driving safety violations and traffic accidents. For example, 1-10 mph over the speed limit may deduct 20 points, and 11-15 mph over the speed limit may deduct 30 points from the score. In addition, unsafe behaviors of talking-while-driving and texting-while-driving can be accordingly associated with different point penalties. The score over a selected time period (e.g. 1 year or 2 years) can be compiled and summarized to form a driving safety score. For example, the score may be an average of each driving score over the time period. The driving safety score data 214 can be shared with a third party through a data sharing interface 216 such as database or XML format. A parent, employer, or insurer may review the driving performance and resulting safety score of a driver through a driving safety monitoring graphical interface 218.

Figure 3:
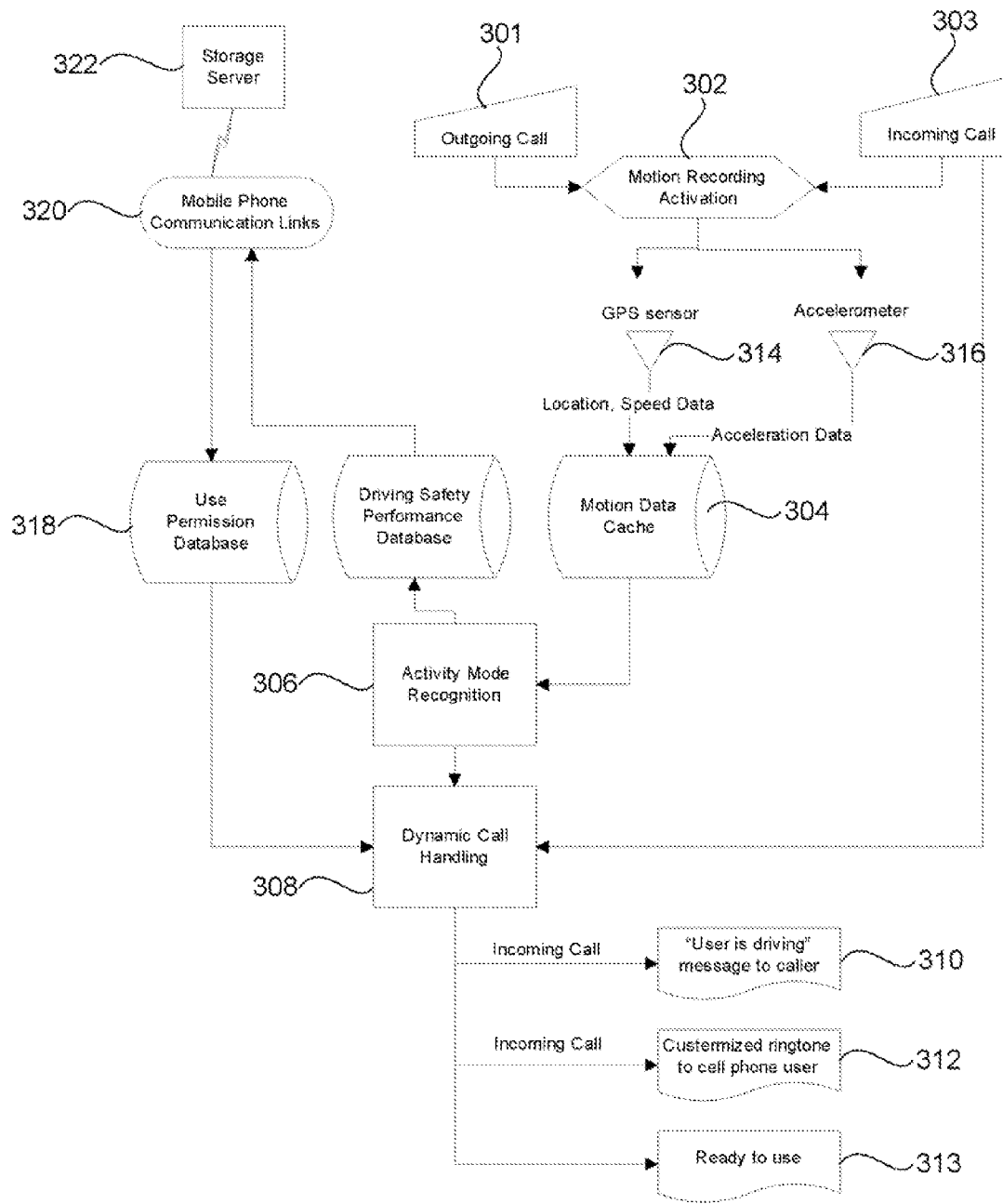
FIG. 3 is a flow chart depicting a driving safety monitoring program on a mobile phone client in accordance with an embodiment of the present invention.

FIG. 3 illustrates a flow chart depicting a driving safety monitoring program on a mobile phone client. If the mobile phone is not in monitoring mode, the motion recording process can be activated 302 on the phone. This may be accomplished by the user of the phone, or through an automated process by the mobile phone client when a selected type of motion is detected. For example, the reporting process may be activated when an outgoing call 301 is made or an incoming call 303 is received.

The GPS receiver 314 can collect location and speed data of the mobile device. The accelerometer 316 can collect acceleration/deceleration data in different axes. Each motion measurement from the GPS sensor and accelerometer can be associated with a timestamp, and stored in a local motion data cache 304 for each pre-specified sampling interval. The activity mode recognition module 306 can use recorded time stamped data to estimate the type of activity: driving, walking, running or remaining substantially still. If no sufficient data are available to identify the activity mode with high confidence, the estimation result is temporally marked as unknown, and the activity mode recognition module 306 can wait for more motion data to make final estimations with high confidence.

If the activity mode is recognized in real-time, the dynamical call handling module 308 can allow or disallow users to receive or make a call, text a message play games, or use other components or software programs on a mobile computing device such as a mobile phone. For an incoming call, a "user is driving" message 310 may be sent to the caller or other appropriate response messages may be similarly programmed and sent based on the collected data. Dependent on the pre-specified priority of a caller, the cell phone user can be notified by different ringtones 312 for different callers so that a decision can be made if the cell phone user needs to pull over to receive the call, or ignore the current in-coming call and make a call back after the user arrives at his/her destination. The dynamical call handling module 308 also determines if the cell phone is allowed to function based on use permission data 318.

The use permission data 318 can be communicated to the mobile computing device through the mobile phone communication link 320 from a computer or server 322, as previously discussed. Data from the motion data cache 304 and the activity mode recognition module 306 can be transmitted to a local driving safety performance database 324. The collected driving safety information can be sent back to the server 322 through mobile phone communication links 320. If the use permission database, activity mode recognition module 306, and motion data cache 304 all signal that the mobile phone is not traveling at a high rate of speed, and is available for use, based on time and location, then it can be placed in a "ready to use" mode 313.

One of the key performance measures for GPS data reception is Time to First Fix (TTFF). To reduce the power consumption, the embedded GPS receiver 314 in a mobile phone is typically turned off by default when a mobile phone is in standby mode or not is not charged. Otherwise, if the GPS receiver is always on, the battery of a GPS-enabled phone can only last a very short time period, e.g. 4-5 hours. To reduce the battery consumption, the GPS receiver is re-activated only right after a phone call is made or received. If the position of the current phone call is different from the position of the previous phone call, which is most likely to occur for a talking-while-driving user, then the GPS receiver needs a cold start, which takes about from 30 seconds to 2 minutes. If the user only takes a couple of seconds to answer the phone call or view the text message, after the communication process completes, the GPS sensor may has not received any reliable GPS location data yet, or may not have sufficient data to make a high-quality estimation for user activity mode.

There are a number of time-sensitive issues that require commercial fleet drivers (i.e. truck drivers, taxi drivers, delivery drivers, etc.) to communicate with dispatchers or other drivers using a cell phone while driving. For example, a driver's cell phone can be used to receive information about a deviation/change from an itinerary or a pre-set route, to receive information regarding special traffic conditions, to report a vehicle breakdown or mechanical problems, and so forth.

In addition, when the driving condition or context requires very low attention from a driver, such as when driving on a rural highway with a low level of traffic, certain types of communication modes (such as talking while driving through headsets) may be allowed to increase the driver's efficiency.

To address the above user needs while ensure driving safety, one embodiment of a system for monitoring and controlling the use of a mobile computing device can be configured to dynamically switch communication mode to GPS mode depending on the complexity of driving conditions. This is in contrast to an embodiment that does not allow any non-emergency cell phone communications at driving mode, especially for teen drivers.

To detect the complexity of a driving situation/context, the activity mode recognition module 306 can use a number of data sources, such as the motion data cache 304, traffic incident reports from public or private traffic information providers, real-time traffic information from roadside sensors, and local traffic data exchanges through vehicle-to-vehicle communications. A statistical model can be used to estimate and classify the complexity of driving situations and driving attention needs, and then accordingly prevent the cell phone use under complex/critical driving contexts.

For example, if a roadside sensor or motion data cache 304 indicates the driver is approaching the tail of a traffic queue, a complex weaving road segment, or a nearby car incident site, then the communication mode can be automatically disabled using the dynamic call handling module 308. The driver can then fully focus on the prevailing driving condition. After the driving condition demands less driving attention and the complexity of the driving condition is classified as sufficiently low, the received messages from dispatchers can be displayed or read to a driver at a later time.

FIG. 4 illustrates that the type of activity can be identified reliably using a post-processing technique of the present invention. Right after an incoming phone or text message is received or an outgoing phone call is made, the GPS sensor and accelerometer can start to record a motion time series. Regardless if the phone communication process (i.e. phone call or text message) is complete or not, the sensors can continue to collect the data for an extended time period, e.g. 6 minutes, to determine the type of the current activity. The risky behaviors of talking while driving or texting while driving may not be identified in real-time due to limited data, but the post-processing technique can deliver high-confidence estimation results. In this manner, any unsafe driving behaviors can be penalized after the fact by deducting the driving safety score in the data server, as previously discussed. In the extended data collection time period, if the user changes the activity mode, for example, from driving to fully stop, or from stop to driving, the system uses acceleration data from the accelerometer to determine the change of activity mode, and then further estimate the motion type before or after the change.

One of the key challenges is how to distinguish driving versus walking. In walking mode, talking through the mobile phone can be allowed, but texting while walking should be discouraged for safety concerns. In driving mode, both talking and texting actions should be prevented. If only GPS data are used in activity mode recognition, it is easy to identify driving mode when the speed is high (e.g. greater than 15 miles/hour). However, when the moving speed is low, it is difficult to distinguish driving, walking or running modes. On the other hand, the accelerometer data can be used to effectively recognize walking and running modes. But when using accelerometer data only, it can be difficult to distinguish if the car/user is moving at a relatively constant speed or remaining substantially stationary.

Figure 5:
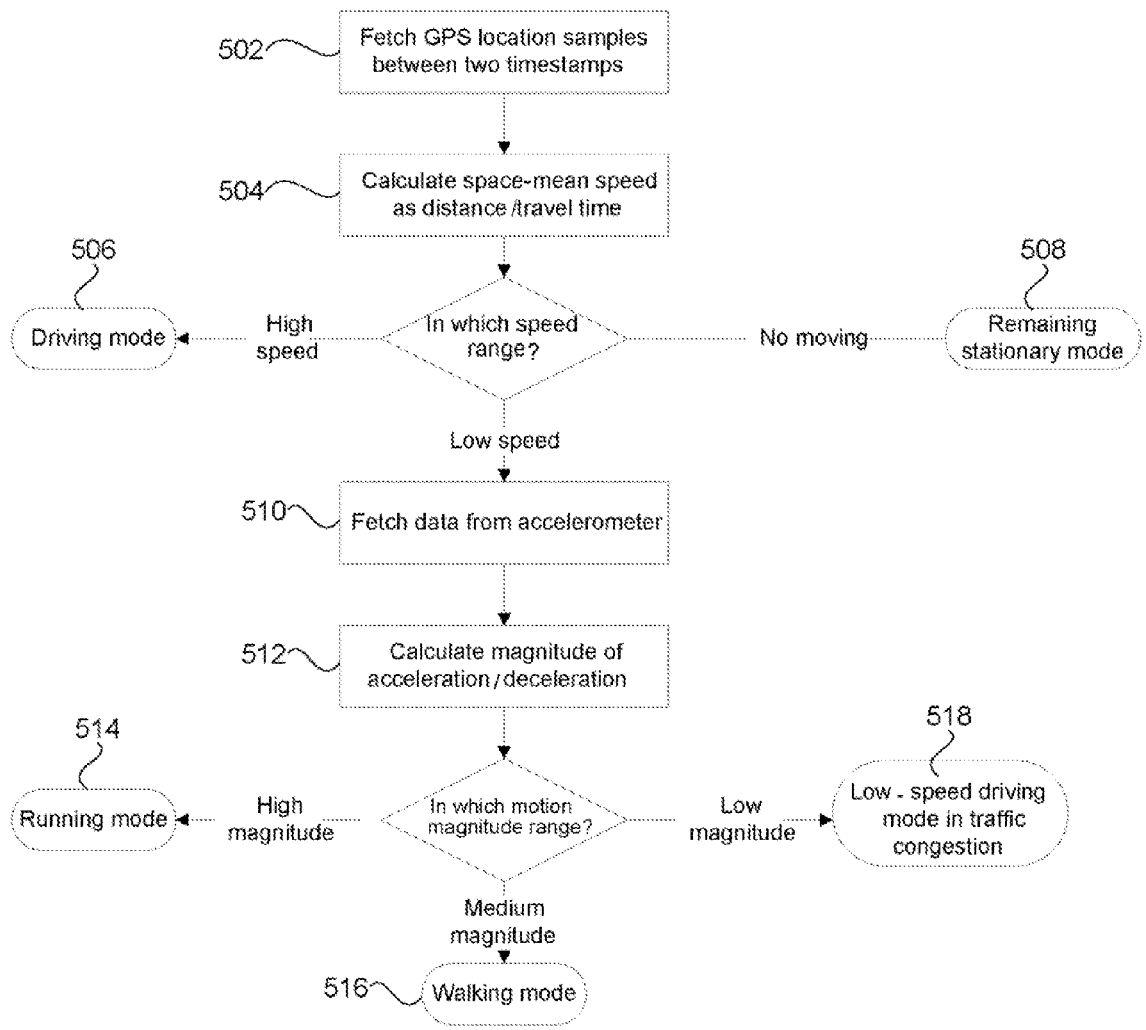
FIG. 5 is a flow chart depicting how to combine two sources of data from the embedded GPS receiver and accelerometer in a mobile phone to precisely identify the type of motion in accordance with one embodiment of the present invention.
Figure 6:
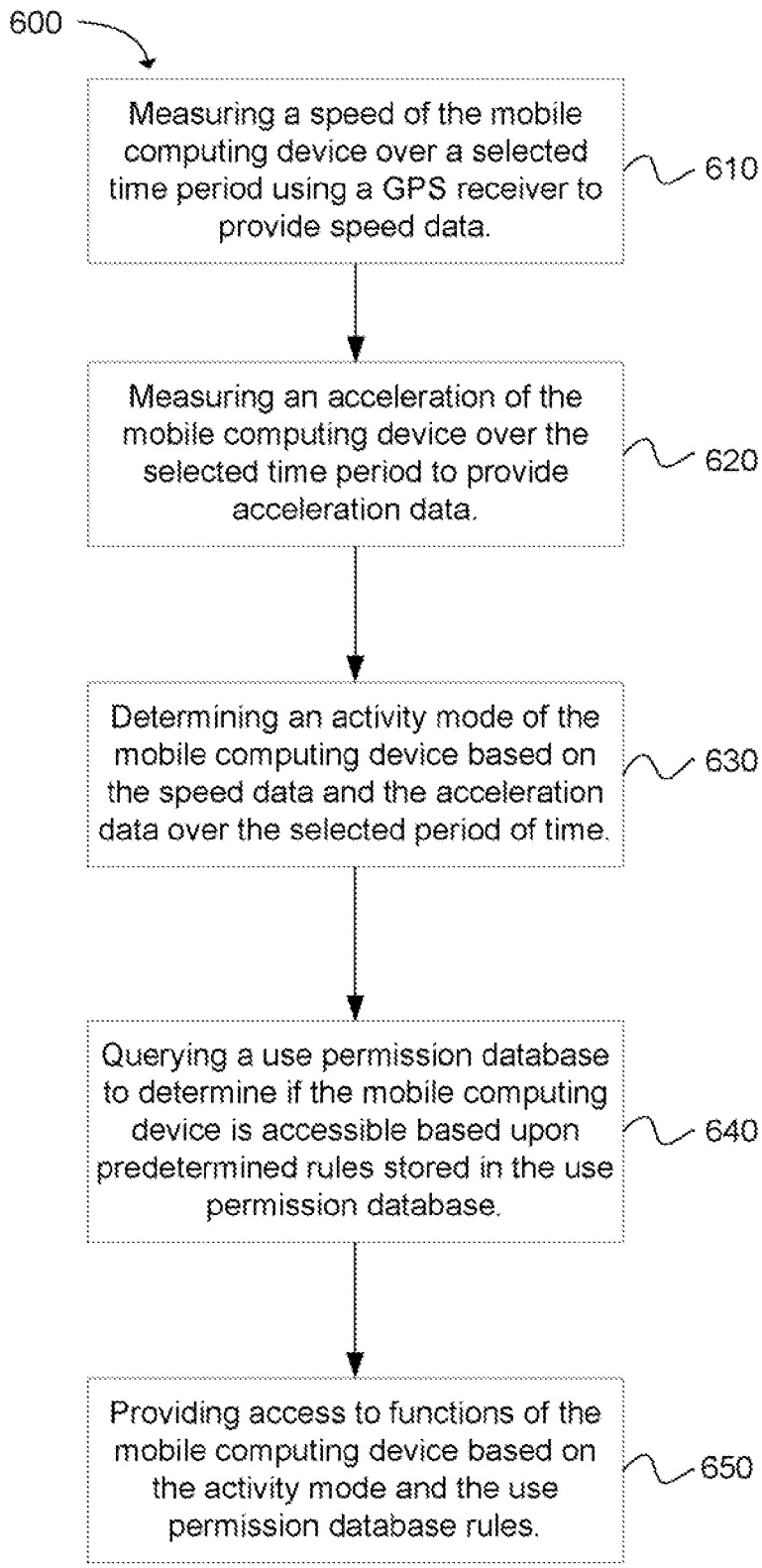
FIG. 6 is a flow chart depicting a method for monitoring and controlling the use of a mobile computing device.

FIG. 5 illustrates how to combine information from GPS and accelerometer sensors to precisely identify the type of activity. In FIG. 5, GPS location data are first fetched from different timestamps 502, and a space-mean speed measure is calculated 504 as traveled distance divided by time interval. If the space-mean speed is in a high-speed range, then the user is likely to be in driving mode 506. If the space-mean speed is substantially near zero or equal to zero, then the user is likely in "remaining stationary" mode 508. If a GPS measurement gives a median range space-mean speed (e.g. 1 mph-15 mph), then accelerometer data need to be fetched 510 and the magnitude of acceleration/deceleration is calculated 512 for the same data collection time interval. If the motion magnitude is high, then the user can be identified as likely to be running 514. If the motion magnitude is in the medium range, then the user is walking 516, otherwise, the user is either driving at low speed purposely or driving under traffic congestion conditions 518. In accordance with an embodiment of the present invention, a method 600 for monitoring and controlling the use of a mobile computing device is disclosed, as depicted in the flow chart of FIG. 6. The method includes the operation of measuring 610 a speed of the mobile computing device over a selected time period using a GPS receiver to provide speed data. An acceleration of the mobile computing device is also measured 620 over the selected time to provide acceleration data. An activity mode of the mobile computing device is determined 630 based on the speed data and the acceleration data gathered over the selected period of time. The activity mode can be selected from walking, running, driving, and stationary.

A use permission database can be queried 640 to determine if the mobile computing device is accessible based upon predetermined rules stored in the use permission database. As previously discussed, the use permission database contains predetermined temporal and geographic limitations at which the mobile computing device can be used. Access is provided 650 to functions of the mobile computing device based on the activity mode and the use permission database rules. Access to the mobile computing device can be provided to inbound calling, outbound calling, texting, and software applications on the mobile computing device based on the activity mode and the use permission database data. In addition, driver safety data can be communicated to a data storage device external from the mobile computing device. The driver safety data includes the acceleration data, speed data, and phone usage data to enable a usage of the mobile computing device to be monitored.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for monitoring and controlling the use of a mobile computing device, comprising:
    a data server containing a use permission database and a model of a road network specifying traffic routes at a selected location;
    a mobile wireless computing device configured to wirelessly communicate with the data server and further including an embedded accelerometer and Geo Positioning System (GPS) receiver;
    a mobile device control module configured to operate on at least one of the mobile wireless computing device and the data server, wherein the module includes:
        a motion data cache configured to record data from the GPS receiver and the accelerometer for a period of greater than one minute, wherein the motion data cache is further configured to record a location, speed, and acceleration of the mobile wireless computing device each time a call is received;
        an activity mode recognition module configured to determine a type of activity based on the motion data cache;
        a use permission module in communication with the data server, wherein the use permission module is configured to:
            receive timing and location information from the use permission database detailing a time period and a location that are permissible to use the mobile wireless computing device;
            determine whether to provide access to functions of the mobile wireless computing device based on the timing information, the location information, and a determination made by the activity mode recognition module that the type of activity is driving; and
            combine information from the motion data cache and the use permission database to determine a driver safety statistic to be calculated based on when the mobile wireless computing device was used; and
    a dynamic call handling module configured to communicate to a caller that the mobile wireless computing device is not available when the activity mode recognition module identifies the type of activity as driving, wherein the dynamic call handling module is further configured to place the mobile wireless computing device in a driving mode when the type of activity is identified as driving.

2. A system as in claim 1, further comprising a computing device in communication with the data server, wherein the computing device is configured to enable a user to input desired restrictions based on the location information and the timing information for the mobile wireless computing device and store the information in the data server.

3. A system as in claim 1, wherein the mobile wireless computing device is configured to download the mobile device control module.

4. A system as in claim 1, wherein the activity mode recognition module is configured to use a single source or multiple sources of motion data to identify when a user of the mobile wireless computing device is performing a task selected from the group consisting of driving, walking, running, and remaining substantially stationary.

5. A system as in claim 4, wherein the mobile wireless computing device is configured to disable making and answering a phone call with the mobile wireless computing device when the device is placed in the driving mode.

6. A system as in claim 4, wherein the mobile wireless device is configured to make emergency phone calls when the device is placed in the driving mode, while being disabled from making and answering non-emergency phone calls.

7. A system as in claim 1, wherein the dynamic call handling module is further configured to place the mobile wireless computing device in a restricted mode that allows selected operations to be performed on the mobile wireless computing device when driving complexity is determined to be below a selected threshold.

8. A system as in claim 1, wherein the dynamic call handling module is further configured to communicate to a user that a call is received when mobile wireless computing device is in the driving mode by using a selected ring tone to enable the user to stop their vehicle and answer the call.

9. A system as in claim 1, wherein the use permission module is further configured to store specific locations and paths along which the mobile wireless computing device is set in a mode in which it cannot receive phone calls, wherein the specific locations are communicated from the data server.

10. A system as in claim 1, further comprising making the driver motion data cache, the user permission data, and the driver safety statistic available on the Internet to selected individuals.

11. A system as in claim 10, further comprising a graphical user interface configured to display the driver motion data cache, the user permission data, and the driver safety statistic to the selected individuals.

12. A system as in claim 10, wherein the driver safety statistic is made available to selected auto insurance companies in return for a predetermined discount for the user when the user's driver safety statistic is greater than selected threshold value.

13. A system as in claim 10, wherein the mobile wireless computing device is operable to answer an incoming phone call while in the driving mode.

14. A system as in claim 13, wherein the driver safety statistic value is decreased when the incoming phone call is answered while the mobile wireless computing device is in the driving mode.

15. A system as in claim 13, wherein the driver safety statistic is decreased based on driving behavior selected from the group consisting of speeding, abnormal acceleration, abnormal deceleration, and sharp turns, driving during school hours, driving after a curfew, and driving outside of routes approved for the use permission module.

16. A method for monitoring and controlling the use of a mobile computing device, comprising:
    measuring a speed of the mobile computing device over a selected time period using a Geo Positioning System (GPS) receiver to provide speed data;
    measuring an acceleration of the mobile computing device over the selected time period to provide acceleration data;
    determining an activity mode of the mobile computing device based on the speed data and the acceleration data;
    querying a use permission database to determine if the mobile computing device is accessible based upon predetermined rules stored in the use permission database, the predetermined rules including a time range and a location that is permissible to access the mobile computing device;
    providing access to functions of the mobile computing device based on the activity mode and the use permission database rules, wherein the activity mode is a driving mode;

communicating to a caller that the mobile wireless computing device is not available when the activity mode is the driving mode; and determining a driver safety statistic to be calculated based on when the mobile wireless computing device was used.

17. The method of claim 16, wherein determining an activity mode further comprises selecting from a walking mode, a running mode, a stationary mode, and a driving mode.

18. The method of claim 17, further comprising querying the use permission database, wherein the use permission database contains predetermined temporal and geographic limitations at which the mobile computing device can be used.

19. The method of claim 17, further comprising communicating driver safety data to a data storage device external from the mobile computing device, wherein the driver safety data includes the acceleration data, GPS data, and phone usage data to enable a usage of the mobile computing device to be monitored.

20. The method of claim 17, wherein providing access to the functions of the mobile computing device further comprises providing access to inbound calling, outbound calling, texting, and software applications on the mobile computing device based on the activity mode and the use permission database data.

* * * * *